Nov. 30, 1937.                R. R. BAKER                 2,100,761
                SYSTEM OF CONTROL FOR DYNAMO-ELECTRIC MACHINES
                          Filed April 13, 1935
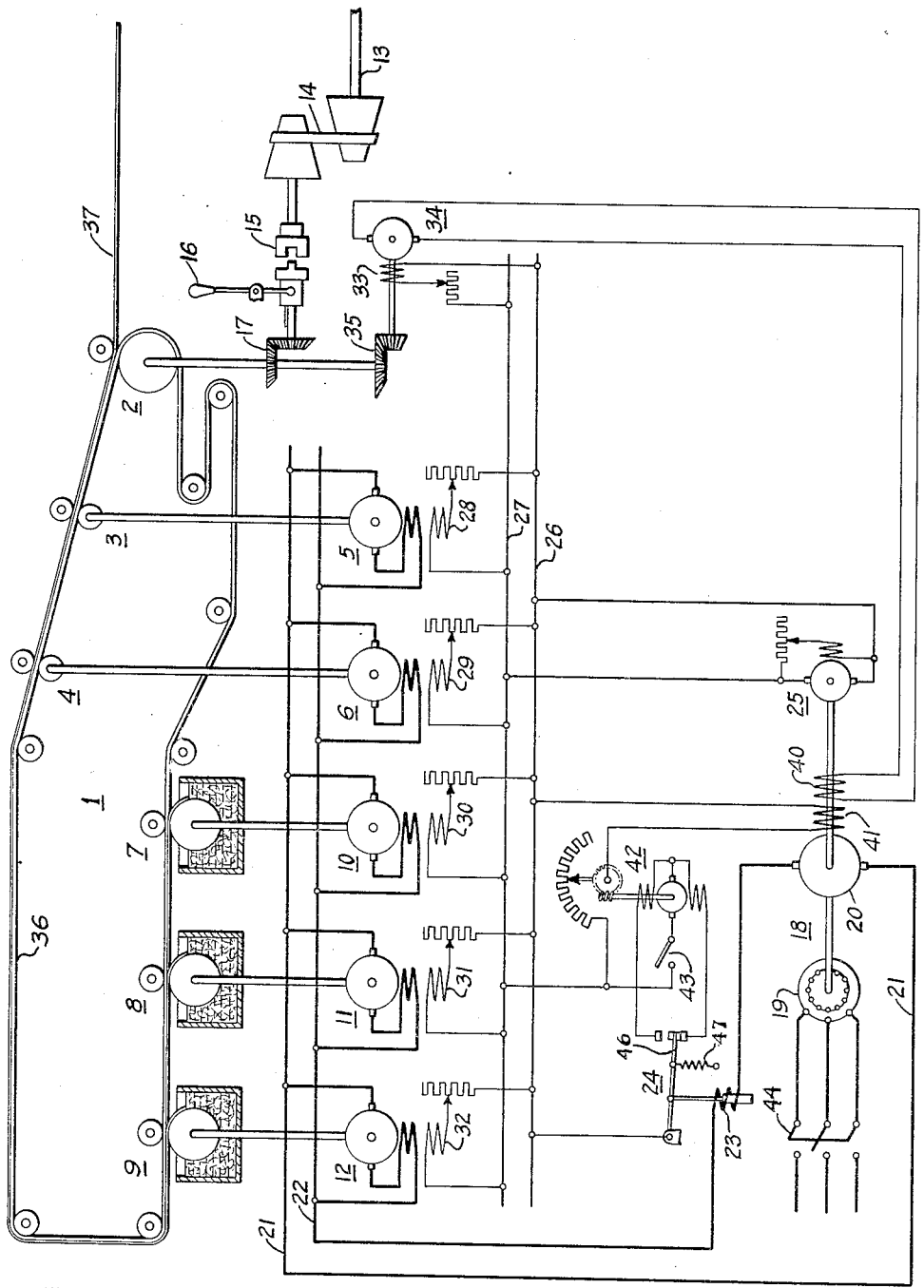
WITNESSES:                                           INVENTOR
                                                   Rest R. Baker.
                                                       BY
                                                 Paul E. Friedemann
                                                      ATTORNEY Patented Nov. 30, 1937

2,100,761

UNITED STATES PATENT OFFICE 2,100,761

SYSTEM OF CONTROL FOR DYNAMO-ELECTRIC MACHINES

Rest R. Baker Swissvale, Pa., assignor to Westinghouse Electric & Manufacturing Company, East Pittsburgh, Pa., a corporation of Pennsylvania Application April 13, 1935, Serial No. 16,176

1 Claim. (Cl. 92—38)

My invention relates to systems of control for dynamo-electric machines, more particularly to systems of control for individual electric motor drive for the wet end of a mechanically driven and controlled paper making machine.

Sectional electric drives with individual motors applied to the wet end of the paper making machine are known. In such sectional electric drives, the motor driving the first main press is connected in parallel with the motors on primary presses and cylinder moulds. By suitable starting control, the voltage on all the motors is varied simultaneously, that is, the voltage is increased until the motors reach operating speed and voltage, at which time the motors are all transferred to the running generator.

With mechanical driving means, the first main press section is driven from a line shaft by means of suitable cone pulleys, belt, clutch, and reduction gear units. The control needs are thus quite different for mechanical drives. In this mechanical type of drive, the first main press section is accelerated by engaging the mechanical clutch and it then becomes necessary to apply voltage to the motorized sections and to accelerate them at a rate equal to that of the main press section.

One object of my invention is to provide for varying the speed of one or more motors in proportion to variations in speed of a main shaft driving a certain element of a paper making machine.

Another object of my invention is to vary the voltage impressed on a motor, or several motors as the case may be, as a function of the speed of a shaft and the losses in the armature of the motor, or the armatures of the motors if more than one motor is to be controlled.

A further object of my invention is to vary the voltage impressed on a motor as a function of the speed of a machine shaft and the losses of the motor.

It is also an object of my invention to vary the voltage impressed on a plurality of parallelly connected motors as a function of the operation of a machine element and the losses of the motors.

To better understand the novel features of my invention and its special utility, its advantages and its general objects, brief descriptions of alternative attempts at solving the problem, will be given.

In attempting to solve the problems presented, a direct-current generator electrically connected to the wet end section motors may be considered as coupled to the first main press intake shaft. Such a generator would operate at constant field excitation and would generate a voltage proportional to the speed at which it is driven. Since such direct-current generator has to be of considerable capacity to supply all the wet end section motors, the drive becomes complicated and expensive. The first main press intake shaft operates at a relatively low speed. A low speed rather expensive generator would have to be used or rather a complicated and expensive mechanical drive providing for a large speed ratio would have to be used. Further, such generator would have to operate at some minimum speed before it can develop sufficient voltage to supply the losses in the wet end section motors and to supply sufficient current to the armatures of these motors to effect their starting. By this arrangement, such delay in the torque available results in considerable stretch and strain in the common felt, as the felt and not the section motors are required to start the sections.

If the foregoing alternative arrangement is modified so that the generator for the wet end section motors is driven from the main line shaft, the voltage generated is made proportional to the paper making machine speed. All the disadvantages explained for the suggested arrangement are still present. This modification has the further disadvantage of synchronizing the operation of the clutch on the first main press section with the starters required between the generator and the wet end section motors. It is thus not only necessary to initiate the action of the clutch and the starters at the same moment, but the acceleration should be equal to that of the first main press roll. This is practically impossible to accomplish as the clutch will not give uniform performance each time it is operated.

It is thus an object of my invention to substantially eliminate the tension in the common felt of a paper making machine for all operating speeds.

Another object of my invention is to provide a simple, efficient and inexpensive system of control for individual drives for the wet end sections of a mechanically controlled paper making machine.

A more specific object of my invention is to provide for controlling the voltage of an independently driven direct-current generator as a function of the shaft speed of the first main press and the losses in the individual wet section electric motors.

Other objects and advantages will become more apparent from a study of the following specification when considered in conjunction with the drawing, in which the single figure is a diagrammatic showing of my system of control as applied to a mechanical drive and control for a paper making machine.

Referring more specifically to the drawing, reference character 1 designates generally a paper making machine shown quite schematically. The machine comprises a plurality of press rolls 2, 3 and 4, of which rolls 3 and 4 are driven by the individual motors 5 and 6. The machine also includes the wet-end sections 7, 8 and 9 driven, respectively, by the motors 10, 11 and 12.

The first main press section 2 is driven from the line shaft 13, through speed control means 14, clutch 15, operable by the handle 16, and the reduction gear unit designated generally by reference character 17.

By suitable manipulation of the clutch 15 and the speed control means 14, the paper making machine may be started and accelerated at will. In the particular showing, when in operation the felt 36 travels in a clockwise direction. The lower rolls of the wet end sections pick up the pulp or digested material and apply it to the felt. After a number of applications, depending on the number of wet-end sections, the character of the product desired, and other factors, the paper 37 leaves the first main press section to pass to other machine elements for further processing, or to a winder.

To supply the motors 5 and 6, driving the press rolls 3 and 4, and the motors 10, 11 and 12, driving the wet-end sections, with suitable energy, I provide a separate motor generator set 18. Such a set is, of course, not limited in speed as would be the case for a generator driven from the first main press roll or from the main line shaft.

This motor generator set includes the substantially constant speed motor 19 and the direct-current generator 20. The direct-current generator 20 has one armature terminal connected directly to the bus 21 and the other armature terminal connected to the bus 22 through the actuating coil 23 of a current regulating device 24.

Since this separate generator 20 is not subjected to speed limitations of the paper making machine, it can be of a standard high speed type and will thus be of much smaller proportions than a low speed generator of comparable capacity. Such separately driven standard generator may be located at any place about the paper mill and need not be positioned at the paper making machine. Space is always at a premium at the paper making machine. Further, by providing a system of control that permits the positioning of the dynamo-electric machines remote from the paper making machine, the equipment need not be protected against moisture or even the direct application of a water hose. Further by the provision of a motor generator set the necessarily cumbersome and expensive form of mechanical drive that would be required if a generator were coupled to the main shaft or the shaft of the first main press roll is not needed.

A separate exciter 25 is also driven by the motor 19. This exciter provides a constant potential to the field windings 28, 29, 30, 31 and 32 of the motors 5, 6, 7, 8 and 9, respectively, and also provides a constant potential to the field winding 33 of the generator 34.

Excitation for the field 40 of the generator 20 is provided by this generator 34 directly connected to the field 40. The generator 34 is driven from the first main press intake shaft. This generator 34 is a dynamo-electric machine of relatively small capacity and can thus be suitably driven from the first main press intake shaft without the need of cumbersome and expensive reduction gears and mechanical control means. For installations now generally in use the capacity of this generator 34 need not be more than one kilowatt.

The main generator is also provided with an auxiliary field winding 41 which is connected to be excited from the constant voltage buses 26 and 27. The relative effect of the two field windings 40 and 41 is so adjusted that when the first main press is not in operation, namely, when the voltage of generator 34 is zero, the field winding 41 will be sufficiently excited to provide a generator voltage of sufficient magnitude to cause enough current to circulate through the armatures of the section motors to overcome the starting torque requirements and to provide the resistance losses.

By the use of my invention, when the first main press roll is started by operating the clutch 15, the exciter, or generator 34, driven by this section will furnish an excitation voltage that is proportional to the speed of the press section. This additional excitation will be applied to the field winding 40 of the main generator, applying as a result, the necessary voltage to the armatures of the section motors to obtain the correct acceleration and operating speed.

The circulating current caused by the field winding 41 assures instant starting of the section motors thus avoiding stretching of the wet end felt at the starting time. By driving the generator 34 from the first main press in the manner shown and described hereinbefore a uniform and equal rate of acceleration is assured between the first main press section 2 and the wet-end section motors 10, 11 and 12, thus avoiding strain or stretch of the felt 36.

By operating the main generator 20 over the straight part of its saturation curve, the voltage applied to the section motors 5, 6, 10, 11 and 12 will be approximately proportional to the operating speed of the first main press roll 2. To provide for a satisfactory adjustment of the generator voltage over wide speed ranges the equipment will include a suitable current regulating device 24 to maintain the current delivered by the main generator within certain defined limits. The current regulating device 24 has an actuating coil connected in series with the armature of the generator 20 and in consequence will control the split series rheostat motor 42 as a function of the load on generator 20. Such control is, of course, only effected when switch 43 is closed. When the demand on generator 20 exceeds a desirable value the excitation of field winding 41 is so controlled that the current flow through the generator is limited. The current regulating device by its characteristics controls the voltage of generator 20 to compensate for the variations in resistance losses with changes in load.

It is, of course, well known that the internal losses of a motor, when the static friction is to be overcome, is a maximum when the motor is at rest. The load current, namely, the current in coil 23, will thus be a maximum at starting and during the acceleration of the motors coupled to the generator 20 will decrease to a lower constant value. The desired function, therefore, of the device 24 controlling the rheostat motor 42 is to decrease the excitation of the field winding 41 as the speed of the motors 5, 6, 10, 11 and 12 is increased, since the need for supplying the losses becomes increasingly less important as the speed goes up, but is very important at the instant of starting. The desired result is to make the excitation of the generator 20 more and more directly responsive to speed as the speed goes up.

In other words, the spring of device 24 so connects the motor 42 that the excitation of field winding 41 is increased, namely, at its maximum, when field winding 40 is not excited. The voltage of generator 20 is thus maintained sufficiently high to supply enough energy to the motors connected to this generator so that the internal electrical losses and the static friction losses are just overcome. The motors will thus start instantly when shaft 13 is started and the clutch 15 is in engagement. This instantaneous and simultaneous starting of the motors with the operation of clutch 15 results, of course, from the initial relatively heavy excitation of the field winding 41 and the rise in the excitation of winding 40. As the current through coil 23 decreases with an increase in speed of the motors, the excitation of field winding 41 is decreased within a certain limit.

It must be remembered that the elements shown in the figure are all in a deenergized condition. Assuming that the attendant wishes to start the operation of the paper machine, he first operates switch 44 to energize motor 19. The generator 20 is thus operated and the exciter 25 is operated. The exciter 25 energizes buses 26 and 27 at a constant potential with the result that field windings 28 to 33, inclusive, are excited at a constant value which value for the respective windings will depend on the adjustment of the respective field rheostats.

The field winding 41 will also be energized and the generator 20 will have a voltage on the buses 21 and 22, the value of which will be determined by the position of the rheostat arm 45. Further, since the motors 5, 6, 10, 11, and 12, are at rest and loaded, the current in coil 23 will be large. Arm 46 will thus be moved up against the bias of spring 47. If the arm 45 is at such a position that the torque of the motors 5, 6, 10, 11, and 12 is too small to just overcome the static friction and internal losses, he actuates switch 43 to the closed position and the motor 42 operates the arm 45 in a counter-clockwise direction until the excitation of winding 41 is increased sufficiently to place a small tension on the felt 36 at each of the wet end sections 7, 8 and 9 and the press rolls 3 and 4. The switch 43 is then opened and the left hand stop (not shown) for the arm 45 of the conventional stops with which rheostats are provided is placed in contact with the arm 45. The switch 43 may then be again closed and the motor 42 acting as a torque motor will hold the arm 45 in some counter-clockwise position against the stop.

After the clutch 15 is operated, the paper machine starts and the press rolls 3 and 4 and the wet end sections 7, 8 and 9 start simultaneously with the operation of press roll 2. As the machine comes up to speed, the excitation of field winding 40 increases as a function of the speed. Before the normal speed has been attained, the current in coil 23 will have decreased sufficiently to cause motor 42 to be connected for reverse operation. The rheostat arm will thus be moved in a clockwise direction until it contacts the conventional stop at the right of the rheostat. The excitation of winding 41 will thus be decreased. The voltage of the generator 20 is thus made more nearly responsive to the speed of the paper machine and the motors 5, 6, 10, 11, and 12 are operated so as to be merely trailing the felt movements at the press rolls 3 and 4 and wet end sections 7, 8 and 9.

The motors 5, 6, 10, 11 and 12 do not as has heretofore been pointed out provide a positive driving torque or force to the felt, but operate in the nature of trailer motors. To operate satisfactory as trailer motors they are given the proper degree of compounding. The motors thus follow the felt speed, but develop just sufficient torque to overcome the turning effort required by the rolls. This design permits the felt to change in length from point to point in its travel without being strained, which would be the result if the sections were driven at a fixed speed, as with mechanical drive, or with motors having a flat speed load characteristic.

The foregoing description of a specific embodiment is not to be taken in a limiting sense. Others skilled in the art, after having had the benefit of the teachings of my invention, may devise other circuit diagrams and control schemes for accomplishing the novel results hereinbefore pointed out and hereafter claimed. I do not wish to be limited to the specific disclosure made but wish to be limited only by the claim and the pertinent prior art.

I claim as my invention:

In a system of control for a machine making sheet material, the combination of, a press section coupled to be driven through mechanical control means from the line shaft operating a plurality of machines, an exciter coupled to be driven from the shaft of the press section and adapted to generate a voltage substantially proportional to the speed of the shaft of the press section, a motor generator set, an exciter coupled to be driven from the motor of the motor generator set, a plurality of section motors connected to be excited at a substantially constant value from the last named exciter, said first named exciter being also connected to be energized at a substantially constant value from said second named exciter, a field winding for the generator of the motor generator set connected to the last named exciter and adjusted so that the voltage of the generator is of a value sufficient to supply the losses of the section motors, and a second field winding for the generator connected to be energized directly from the first named exciter.

REST R. BAKER.